United States Patent [19]

Johnson

[11] Patent Number: 4,637,155
[45] Date of Patent: Jan. 20, 1987

[54] KEEPNETS

[76] Inventor: Michael D. A. Johnson, Flat D, 1 Morpeth Terrace, Westminster, London SW1 P1EN, England

[21] Appl. No.: 828,330
[22] PCT Filed: May 29, 1985
[86] PCT No.: PCT/GB85/00230
 § 371 Date: Jan. 27, 1986
 § 102(e) Date: Jan. 27, 1986
[87] PCT Pub. No.: WO85/05537
 PCT Pub. Date: Dec. 19, 1985

[30] Foreign Application Priority Data

May 31, 1984 [GB] United Kingdom ............... 8413898
Jan. 12, 1985 [GB] United Kingdom ............... 8500899

[51] Int. Cl.$^4$ .................... A01K 69/02; A01K 79/00
[52] U.S. Cl. ............................................. 43/7; 43/55
[58] Field of Search ........................................ 43/7, 55

[56] References Cited

U.S. PATENT DOCUMENTS 756,097  3/1904  Burroughs ............................. 43/55
772,360 10/1904  Jensen ................................... 43/55
3,015,902 1/1962  Mount .................................... 43/7

FOREIGN PATENT DOCUMENTS 718598  11/1954  United Kingdom .................... 43/7
1446532  8/1976  United Kingdom .................... 43/7

Primary Examiner—Nicholas P. Godici
Assistant Examiner—Christopher L. McKee
Attorney, Agent, or Firm—Walter C. Farley

[57] ABSTRACT

Keepnets allowing safer and easier release of fish retained therein with reduced danger of damage to the fish comprise a tubular net (1) open at one end (2) and closed at the other (3), the net having a rigid mouth-ring (5), a terminal ring at the closed end and a plurality of intermediate support rings (4) spaced along its length between the mouth-ring and the terminal ring. One of the intermediate rings (10) is of substantially rigid construction as opposed to the relative flexibility of the remaining intermediate rings (4). The rigid ring (10) is used as a secondary mouth when releasing the fish to reduce the length of net over which they have to be tumbled and thus the risk of damage to them. Various designs of net using this principle are described.

18 Claims, 29 Drawing Figures

FIG.I
(PRIOR ART)

side view          end view

22

22

FIG.17a
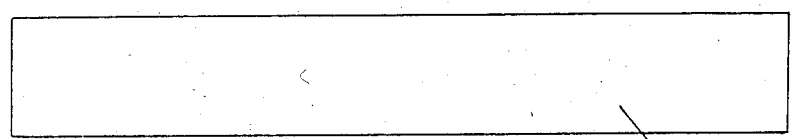
29
FIG.17b
29
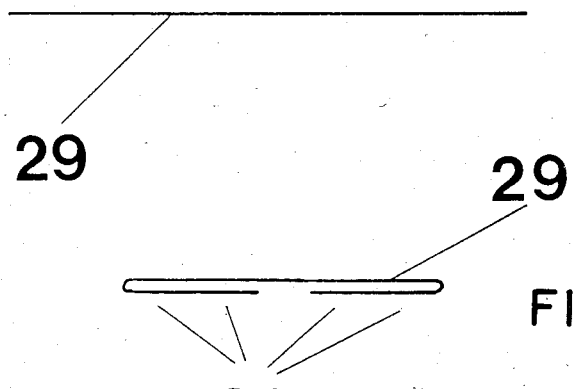
29
FIG.17c
30
32  31
FIG.17d
33  34
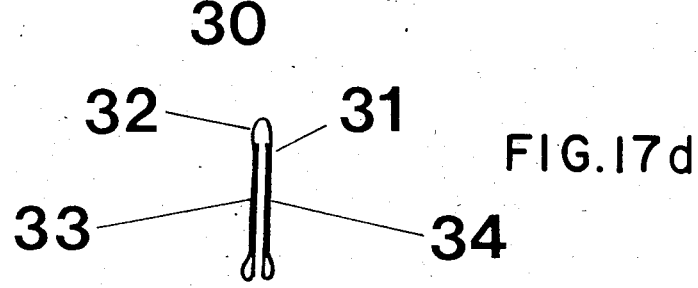

KEEPNETS

The present invention relates to keepnets which are used to retain captured fish in the sport of coarse angling and in particular to improved keepnets which allow safer and easier release of fish.

The National Angling Survey published in 1980 estimated that there were well over two million coarse anglers in Britain. It has been estimated since that these anglers could easily account for over 500 million rod-caught fish per year with most of these fish being retained in keepnets for variable periods of time.

Although the question as to whether angling is cruel remains open to debate, there is clear evidence that some fish do suffer stress and injury from the use of keepnets. Of particular concern is the problem of releasing fish from such nets.

In October 1981 the National Angler's Council published a press-release entitled 'Angling and the R.S.P.C.A.' which listed the specific recommendations of the Medway Report. On the subject of keepnets the report emphasised the need for 'improved keepnet designs' and in his article entitled 'A Net Nightmare' (Angling Times 29/9/82), Richard Walker, Britain's leading authority on coarse angling, expressed concern about the problem of releasing fish and stated that 'it should not be beyond human intelligence to devise a safe, effective release for keepnet bottoms'. The invention and its various embodiments described in the present application provide answers to the problem.

THE STANDARD KEEPNET

A standard keepnet as used prior to the present invention is illustrated in FIGS. 1 and 2 of the drawings, in which:

FIG. 1 is a schematic side view of a conventional keepnet in use for retaining captured fish; and FIG. 2 is a similar view illustrating the release of captured fish from this net.

In these Figures and in FIGS. 3 to 20 referred to below, corresponding elements have been given the same reference numerals in all the Figures.

A keepnet as illustrated in FIG. 1 is basically a cylinder of fine knot-less mesh indicated in outline only at 1, having an open end 2 and closed at the other end 3. The netting 1 is supported by a series of thin flexible plastic rings 4 which are sewn into the mesh at regular intervals along its length. The open end 2 is supported by a ring 5 usually made from aluminium alloy and stout plastic tubing. Usually the diameter of this ring 5 (called the 'mouth-ring') can be extended to increase the gape of the net. The alloy part of the mouth-ring has a screw adaptor designed to receive the end of a detachable metal pole 6 (called the 'bank-stick') with which the net is secured into the bank-side mud. The closed end 3 is usually provided with a central handle 7. In FIG. 1, the water level is indicated at 8 and the bottom contour of the lake or river at 9.

Most keepnets are 8-12 feet long (2.4-3.6 meters) and 18-24 inches in diameter (0.45-0.60 meters). The spacing between the flexible plastic support rings 4 is usually about one foot (0.03 meters).

RELEASING FISH FROM A STANDARD KEEPNET

When fish are to be released, the keepnet is withdrawn from the water in such a way that the fish always accumulate at the closed end. By lifting up the closed end using the terminal support ring or the handle 7, the net is inverted and the fish are tumbled down the entire length of the net to the open end, as shown in FIG. 2.

The main problem is that fish are damaged by the effects of this extensive tumbling, which usually causes loss of scales and split fins. This is one of the reasons why keepnets are banned from some fisheries.

Furthermore, in competition angling, the catch is 'poured' from the keepnet into a weighing-net or wire basket and then weighed before being finally released. This too causes injury.

It should be noted that although fish can be removed from a keepnet by collapsing the net on the bank with the open end uppermost, this only works well for catches comprising a few relatively large fish which can be picked out individually. With large catches of variable-sized fish this procedure becomes too time-consuming and many small fish become 'lost' in the collapsed mesh.

A SUMMARY OF DEVELOPMENTS IN KEEPNET DESIGN SINCE ABOUT 1965

Before about 1965 keepnets were generally much shorter in length and often much wider in diameter than their modern-day counterparts. They were usually made from a wide-aperture knotted cotton mesh which proved to be time-consuming to dry out after use and highly susceptible to rotting. The supporting rings, which were threaded through the mesh, were made from relatively thin flexible metal wire which would inevitably bend and twist with use resulting in a loss in their shape. Towards the end of the decade the cotton mesh was gradually phased out in favour of wide-aperture knotted nylon mesh which overcame the problems of drying and rotting. The wire support rings were at the same time replaced by the flexible plastic support rings which are used universally today. The flexible plastic support rings gained rapid popularity mainly because they enabled a round-framed keepnet to be easily packed away into a rectangular box-shaped wicker basket or creel for convenient transport.

Although the newer keepnets proved to be more durable than their predecessors it was generally recognised that the knotted mesh caused considerable injury to fish. Consequently, when knot-less, seam-less and rot-proof nylon or polyester-type meshes were introduced in the early nineteen-seventies, they rapidly gained acceptance and are used exclusively today. The fact that these new meshes were available with much smaller apertures (micromesh) made them particularly useful for keepnets used in competition angling where very small fish are commonly sought.

Since the introduction of knot-less micro-meshes, keepnets have generally become longer, with lengths of 3.5 and 4 meters becoming increasingly common. This is of course to provide more swimming space for the captured fish. The only other improvements in the commercially available keepnets in recent years are that the flexible plastic support rings are sewn into the mesh rather than threaded through it (this is particularly necessary with fine micro-mesh) which provides more cost-effective production-line manufacturing of keepnets; and that nearly all keepnets nowadays have a tilting device fitted to the extendible mouth-ring which allows the angle of attachment to the bankstick to be adjusted.

THE PRESENT INVENTION

It is an object of the present invention to provide improved keepnets which at least reduce and may even eliminate damage to fish during their release from the net.

According to the invention, there is provided a keepnet comprising an elongate tubular net open at one end and closed at the other, a substantially rigid ring or frame at the open end serving to hold open the mouth of the net, and a terminal ring or frame at the closed end thereof, said net being supported by a plurality of rings or frames spaced along the length thereof intermediate said mouth-ring or frame and said terminal ring or frame, at least one of said intermediate rings or frames being substantially rigid whilst the remainder thereof are relatively flexible, and said mouth-ring or frame being sufficiently larger than said intermediate rings or frames including said rigid ring or frame, to permit passage of the latter therethrough, whereby said substantially rigid ring can serve as a secondary mouth-ring during removal of fish from said net.

Usually, only one of the intermediate flexible rings will be replaced with a substantially rigid ring but in certain embodiments of the invention which are described hereinafter, more than one of the flexible intermediate rings are replaced by substantially rigid rings, but, in general, the replacement of more than one of the intermediate flexible rings is not desirable, if only from the point of view of cost.

With such an arrangement, fish can be removed from keepnets safely and efficiently using one or other of the following three mechanisms which are all based on the use of a substantially rigid intermediate ring in accordance with the invention.

The three mechanisms have all been tried and tested and their effectiveness proved. The designs are basically simple, easy to use and can be adapted to provide any size or specification of modern keepnet (with round or square/rectangular frames). From a manufacturer's viewpoint the materials and manufacturing costs are likely to be minimal resulting in a marketed keepnet which is favourably priced. From the angler's point of view the keepnets according to the invention are practical as well as more conservation-oriented. The fact that the method of releasing the catch does not involve an opening device at the closed end, which may be viewed as potentially capable of failure with a heavy catch, will give competition anglers full confidence in purchasing such a net.

Embodiments of the invention employing the three mechanisms will now be described with reference to FIGS. 3 to 20 of the drawings, in which.

Figure 9:
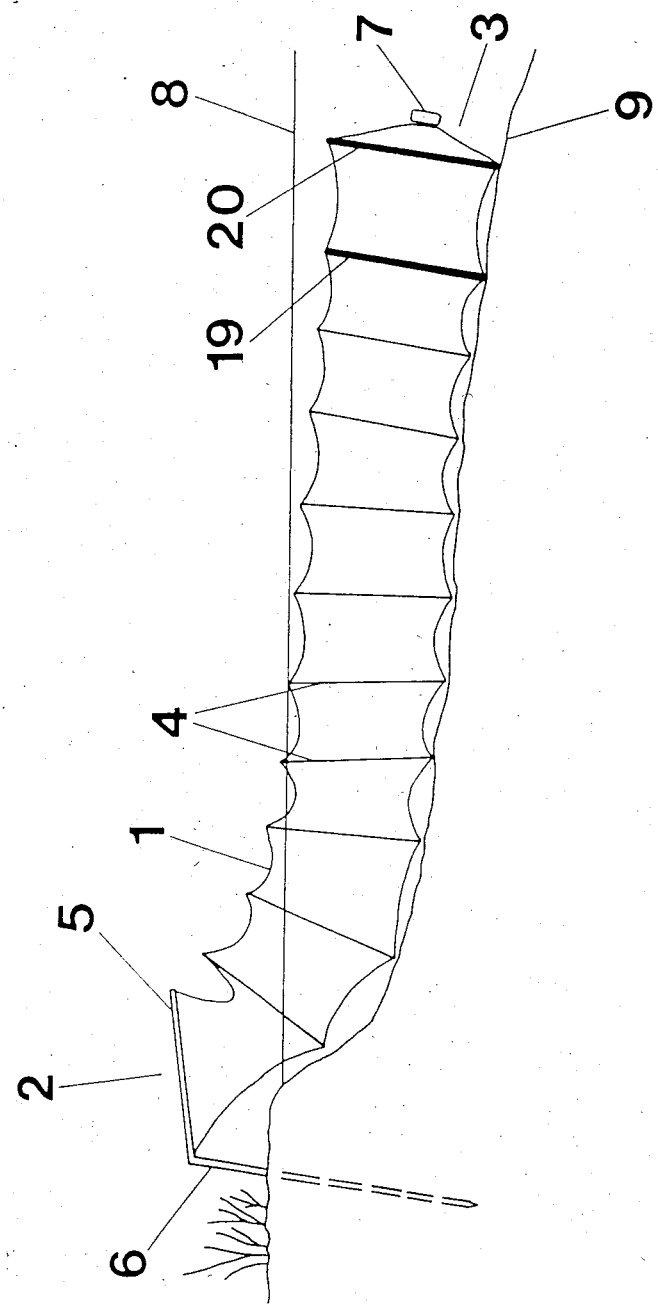
FIG. 9 is a schematic side view of a keepnet in use, fitted with a Doc-end utilising the second mechanism.
Figure 12:
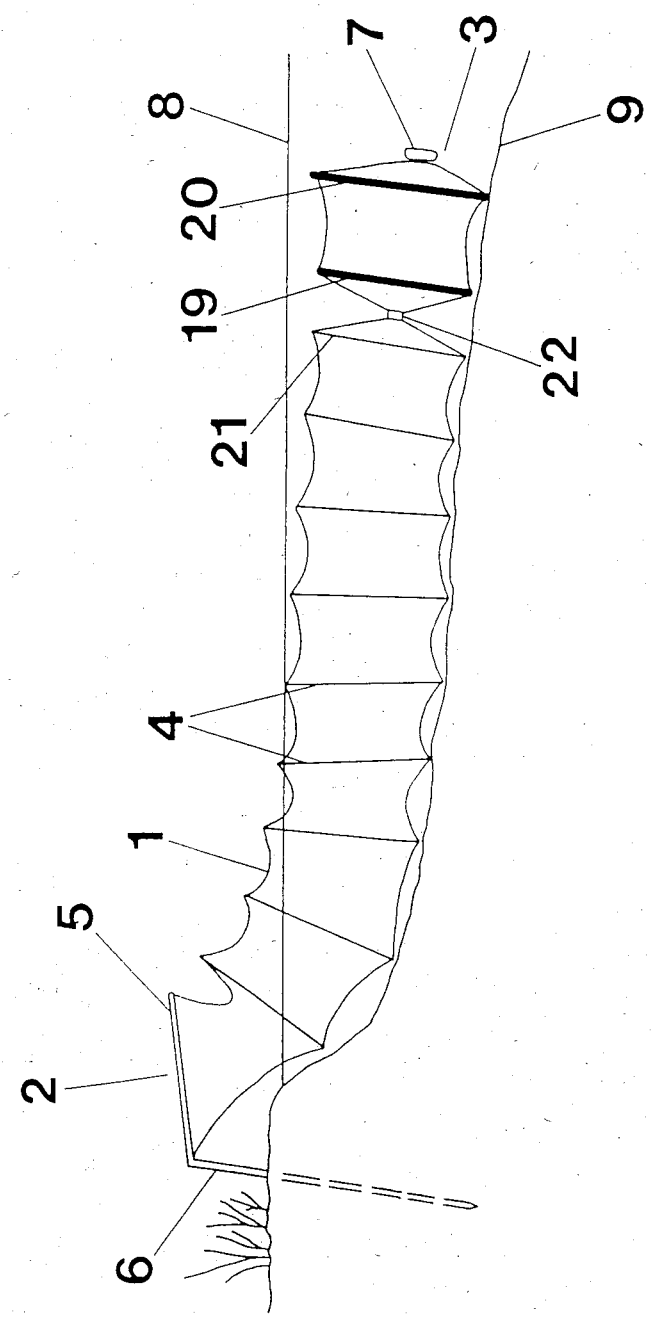
FIG. 12 is a similar view to that of FIG. 9 of another form of keepnet utilising the second mechanism.
Figure 13A:
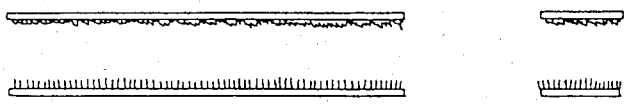
Figure 13B:
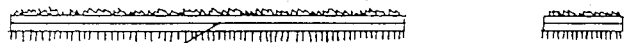
Figure 13C:
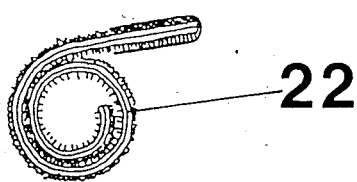
Figure 14:
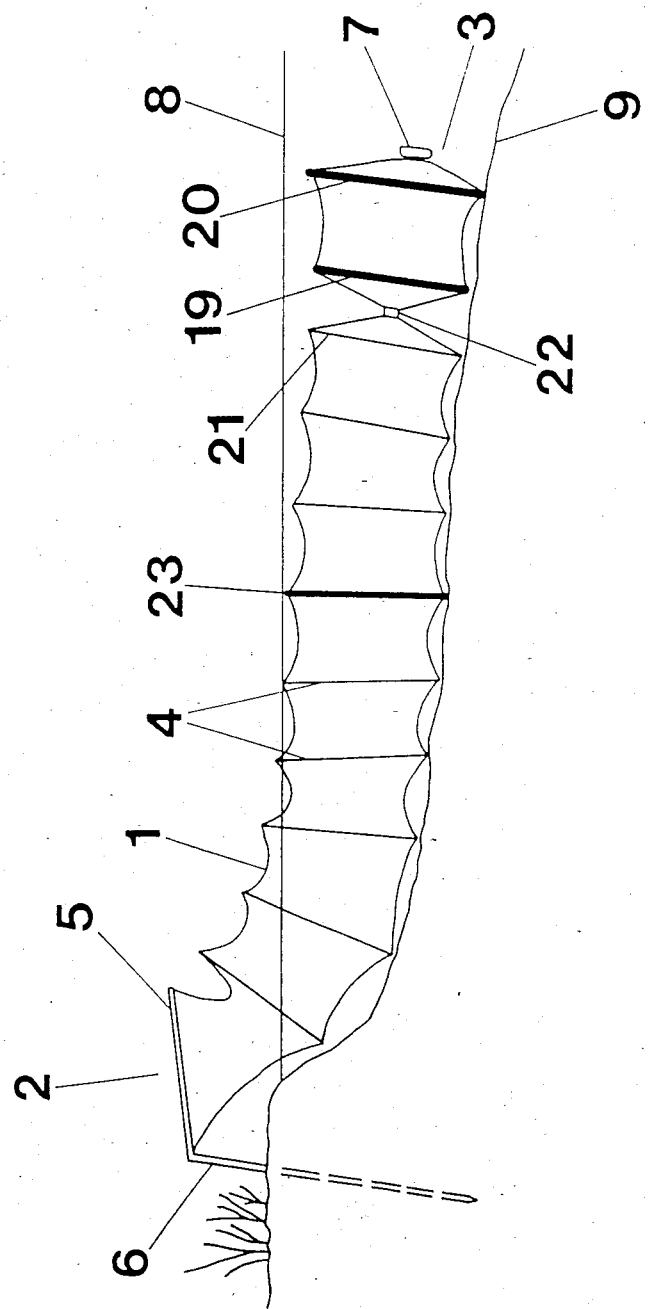
Figure 15:
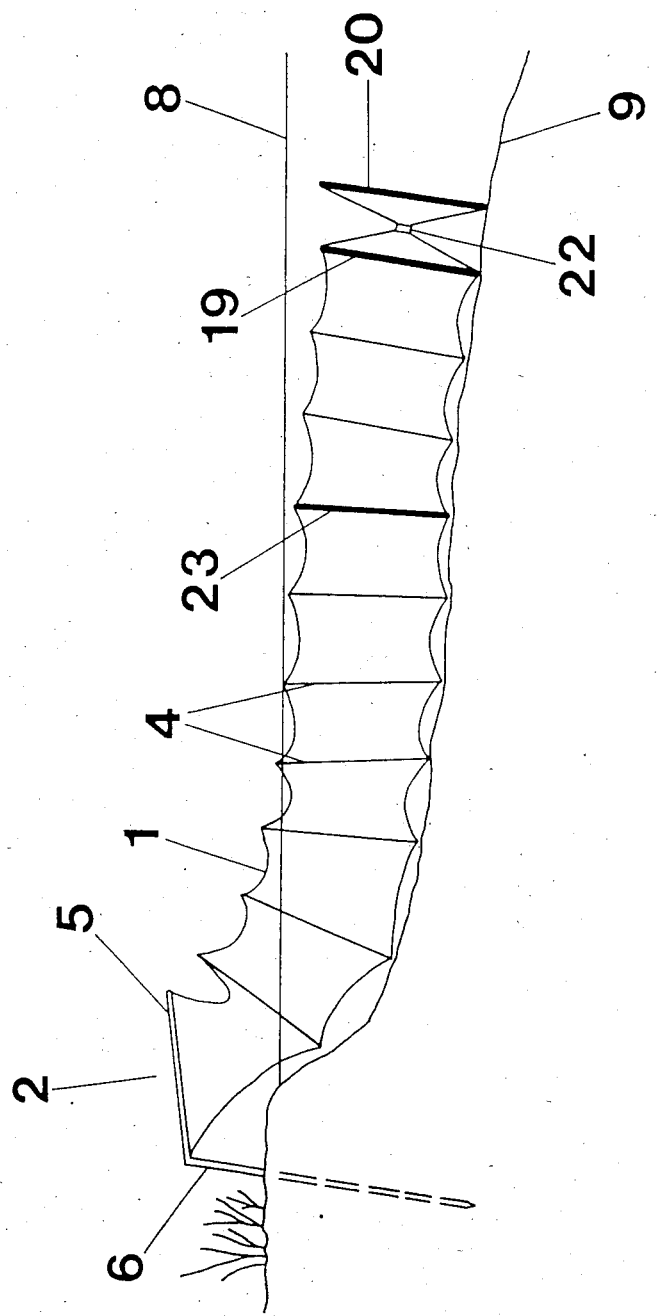
Figure 16:
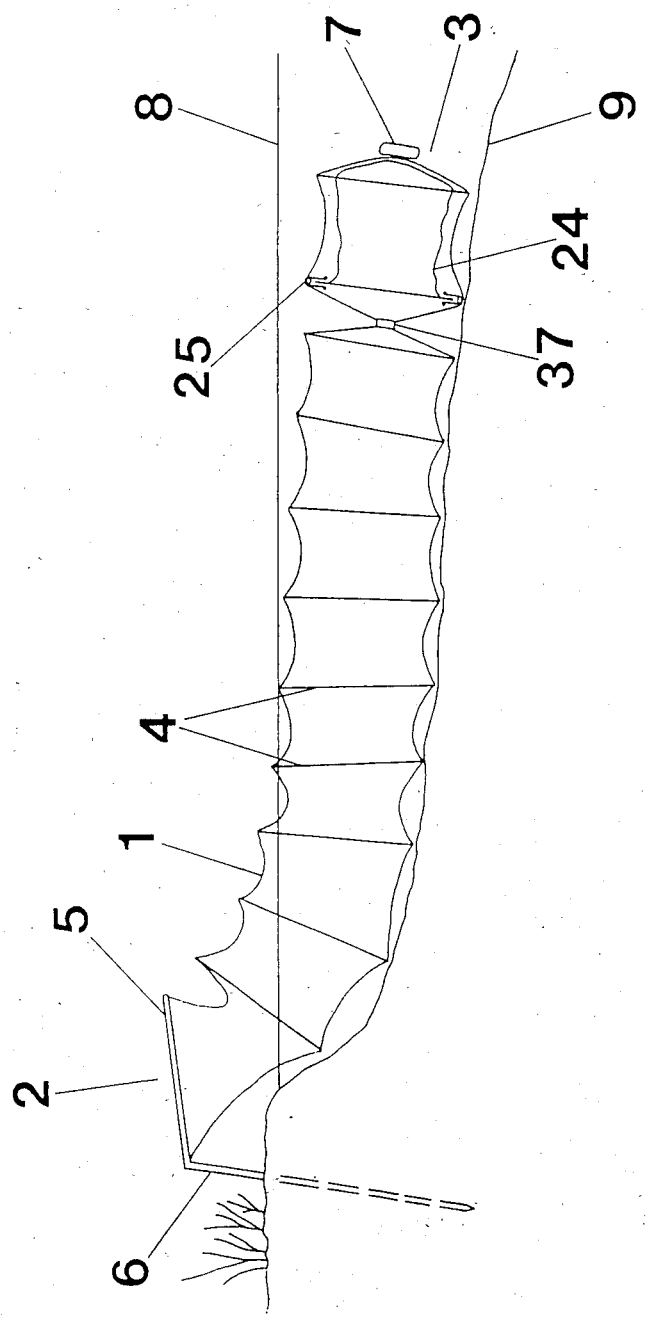
Figure 18:
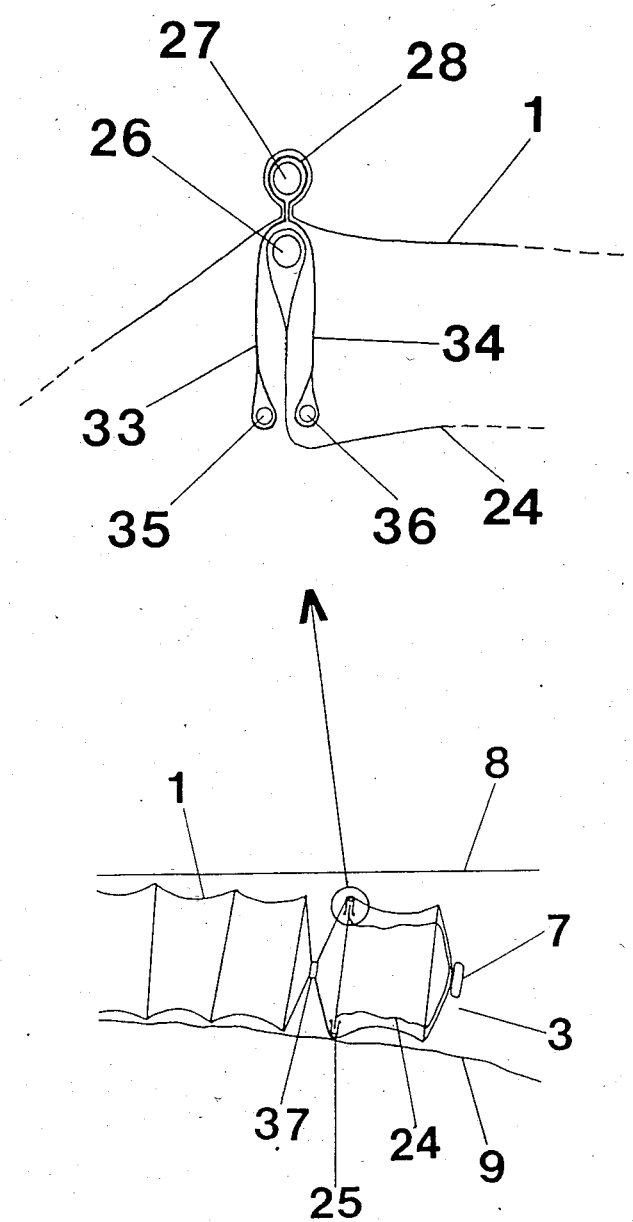
Figure 19:
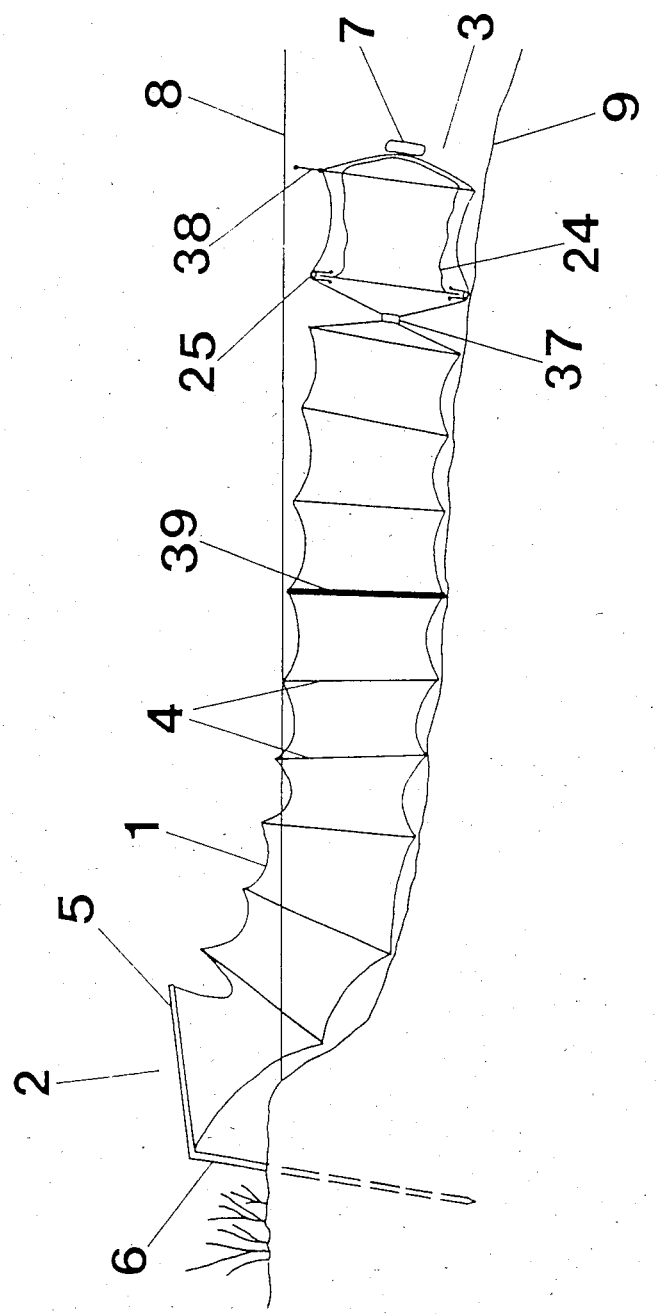
Figure 20:
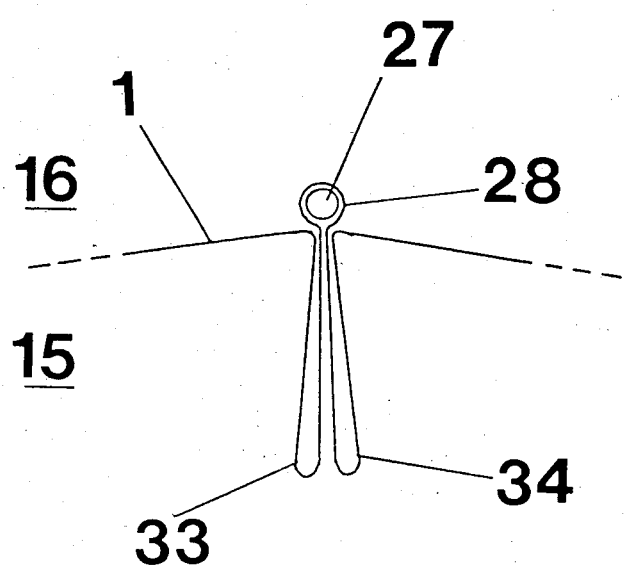

FIGS. 13(a), (b) and (c) are schematic side views to illustrate a double-backed burr-type fastener strip for use as a quick-release fastener in the keepnet of FIG. 12;

FIG. 14 is a similar view to that of FIG. 9 of yet another form of keepnet utilising the second mechanism;

FIG. 15 is a schematic side view of a keepnet according to the invention provided with an openable closed end;

FIG. 16 is a schematic side view of a keepnet according to the invention provided with a Doc-end weighing-net assembly and utilising the third mechanism;

FIGS. 17(a) to (f) are schematic views illustrating succesive steps in the production of a weighing-net holder for use in the keepnet of FIG. 16, FIGS. (e) and (f) being schematic end sectional and side views of the assembled holder;

FIG. 18 is a schematic view of part of the keepnet of FIG. 16 on an enlarged scale to illustrate use of the weighing-net holder to retain the weighing net;

FIG. 19 is a view similar to that of FIG. 16 of a further form of keepnet according to the invention utilising the third mechanism; and FIG. 20 is a schematic side-sectional view of part of a keepnet utilising the third mechanism to illustrate a further way of forming the weighing-net holder.

MECHANISM ONE: THE 'DOC-RING'

The simplest idea involves the mere substitution of one of the flexible plastic support rings of the keepnet with a substantially rigid ring of about the same diameter positioned not more than approxmately half-way along the keepnet length from the closed end. Such a substantially rigid ring will for brevity and clarity be referred to hereafter as a 'Doc-ring'.

Figure 1:
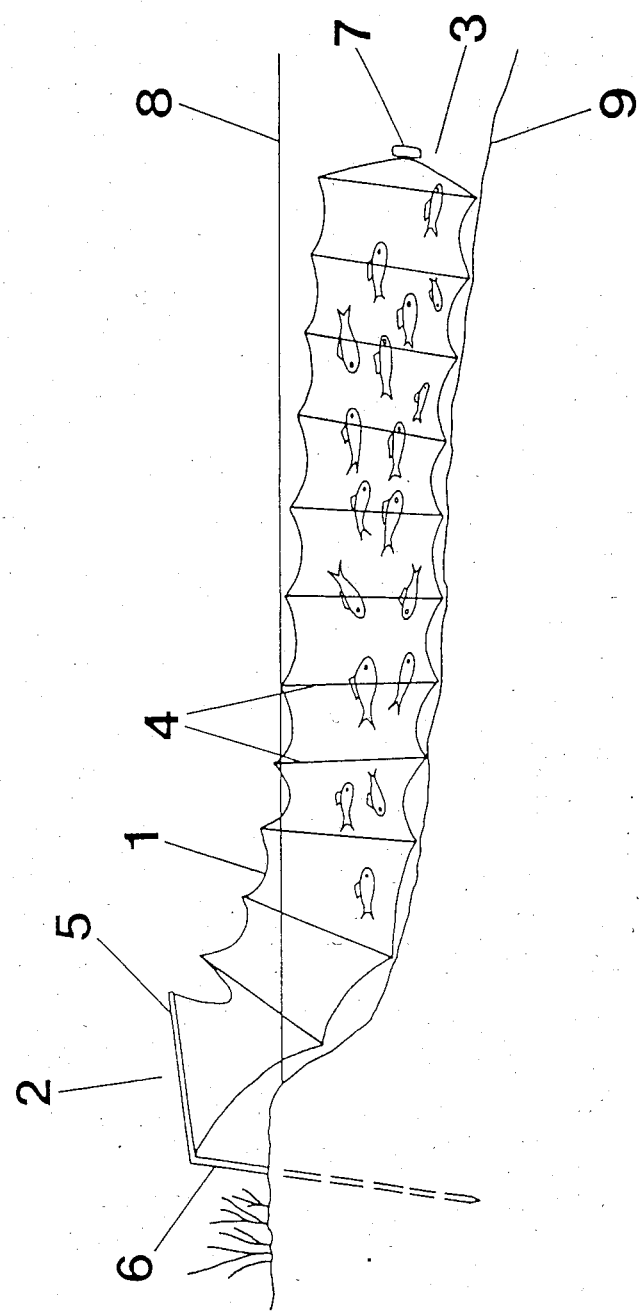
Figure 2:
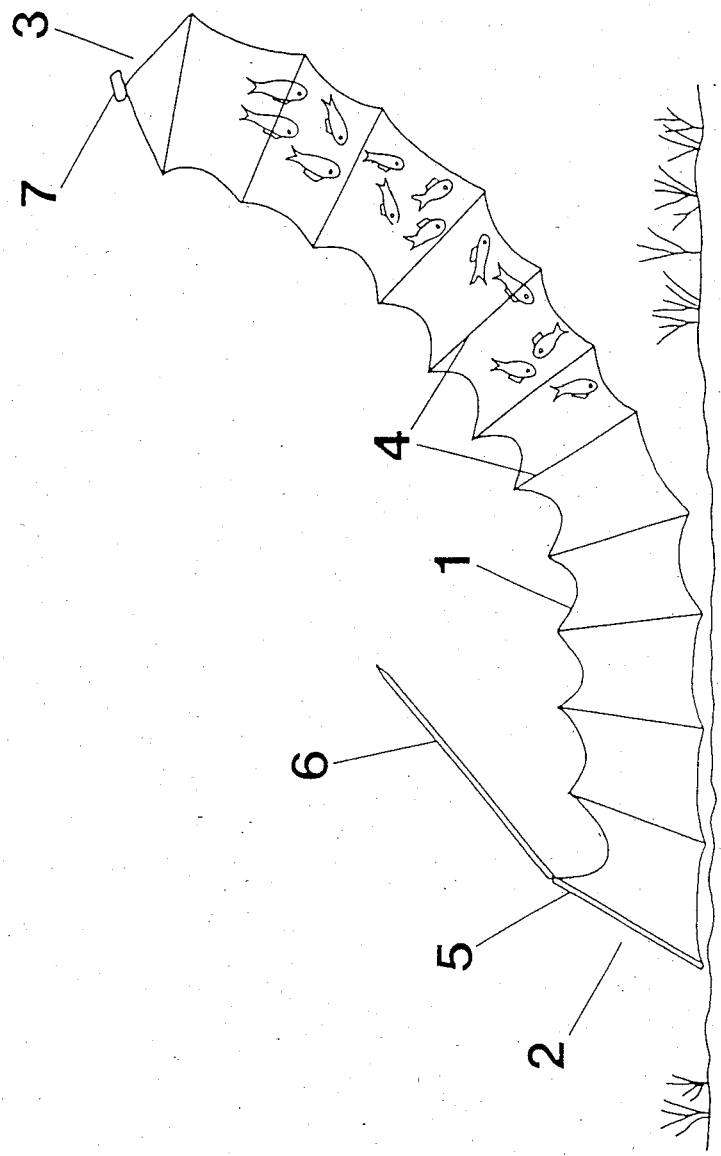
Figure 3:
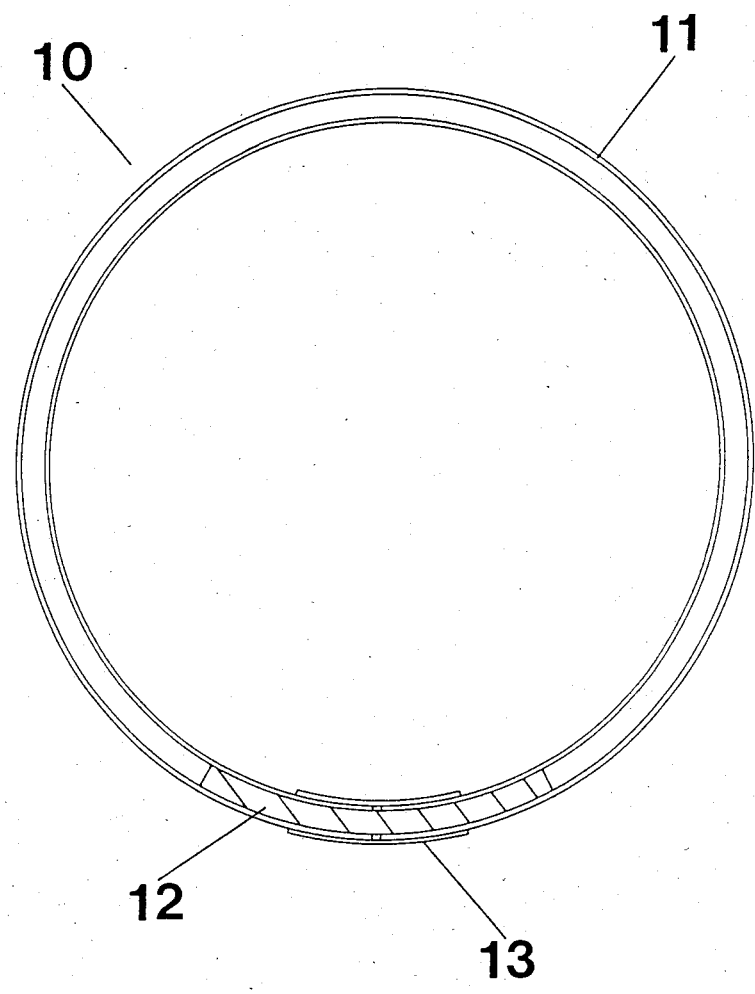
FIG. 3 is a schematic end sectional view of a preferred form of Doc-ring for use in the invention.

The Doc-ring can be made from any suitable material. This would include: strong and substantially rigid plastics tubing, solid plastic, rod, aluminium alloy tubing or solid alloy rod, other suitable metals, fibreglass carbon-fibre or other suitable synthetic materials. One form of Doc-ring which field tests have shown to be very effective is shown in FIG. 3. The Doc-ring 10 is made from a length of strong, inflexible plastics tubing 11 (such as UPVC) of about half-inch (13 mm) diameter the open ends of which are joined with a metal plug 12 (made of aluminium aloy or steel rod) and the junction sealed with a plastics or rubber sleeve 13 to prevent entry of water in use.

Apart from being cost-effective to produce, this form of Doc-ring has the added advantage of having what could be best described as 'upright stability' when in water. The buoyancy of the air trapped within the plastics tubing 11 is counter-balanced by the weight of the metal plug 12. Depending on the weight of the plug 12, the Doc-ring can have semi-buoyant, slow-sinking or fast-sinking properties. In each of these cases the Doc-ring remains vertically positioned in the water and this of course serves to prevent the keepnet from collapsing when underwater. When this type of Doc-ring is being fitted to a keepnet it is obviously important for the weighted region of the Doc-ring to be positioned on the underside (or belly) of the keepnet. A coloured cloth tab can be sewn into the mesh on the underside of the keepnet to indicate the exact point of alignment with the mid-point of the metal plug within the Doc-ring.

Other constructions of Doc-ring can, of course, be used. For example, a length of metal rod may substantially fill the whole length of the interior of the plastics tubing. This may increase rigidity, but, of course, loses the advantage of buoyancy, and is more expensive to produce. However, its use is desirable in certain embodiments of the invention to be described hereinafter.

Figure 5:
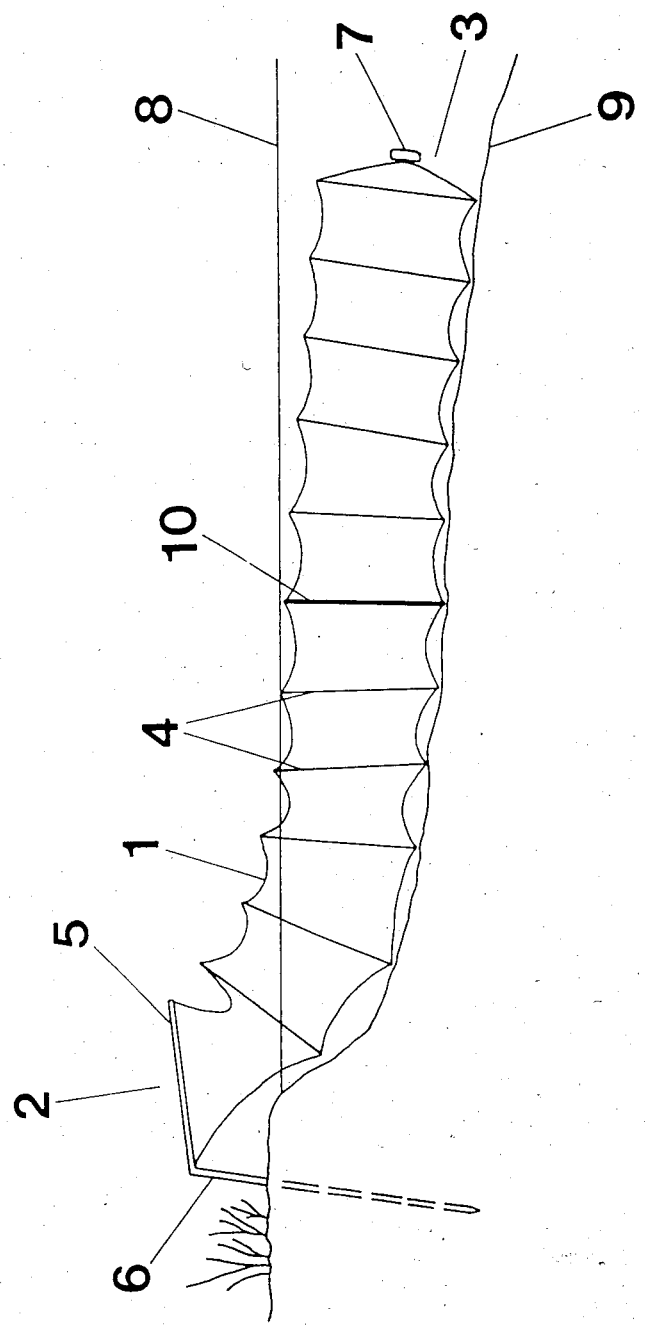
FIG. 5 is a schematic side view of a keepnet in use fitted with a Doc-ring, utilising the first mechanism.

To be effective, the Doc-ring can be used to substitute any of the flexible plastics support rings of a standard keepnet. As illustrated in FIG. 5, a suitable position is about half-way down the keepnet length, but preferably nearer to the closed end than to the open end. In this position, the Doc-ring does not in any way interfere with fish being introduced into the keepnet nor does it in any way affect fish being retained within it since they tend, on the whole, to accumulate at the closed end.

Figure 4:
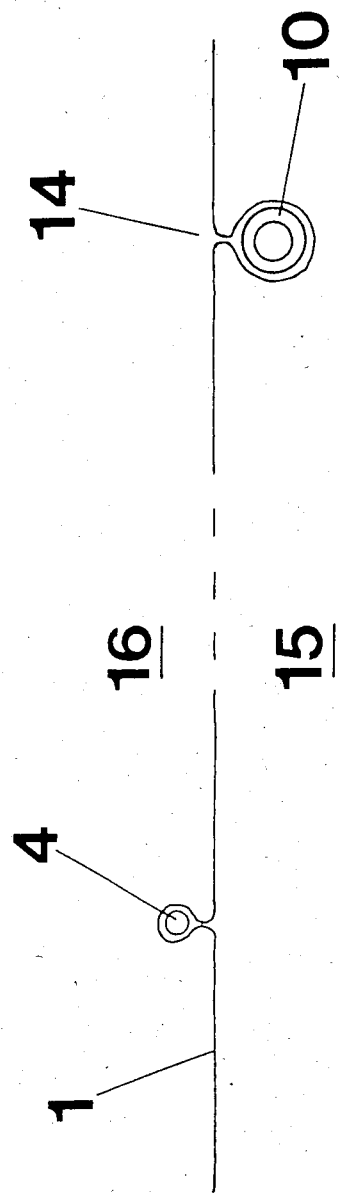
FIG. 4 is a schematic side view of part of a keepnet according to the invention to illustrate alternative ways of positioning flexible support rings and Doc-rings.

The Doc-ring can be sewn into the keepnet mesh in a similar manner to the flexible plastic support rings 4 so that it lies outside of the net cavity where the fish are retained. As shown in FIG. 4, the Doc-ring can in fact equally be sewn into the mesh as at the position 14 so that it lies inside the net cavity but the former position is preferable since it is easier to accomplish in the manufacture of keepnets. (In FIG. 4, the reference numeral 15 indicates the interior or cavity of the keepnet and the reference numeral 16, the outside of the net).

For additional efficiency the distance between the Doc-ring and the flexible plastic support rings on either side thereof can be marginally increased (by up to about 10 cms) from the standard distance between the flexible plastic support rings.

Figure 6A:
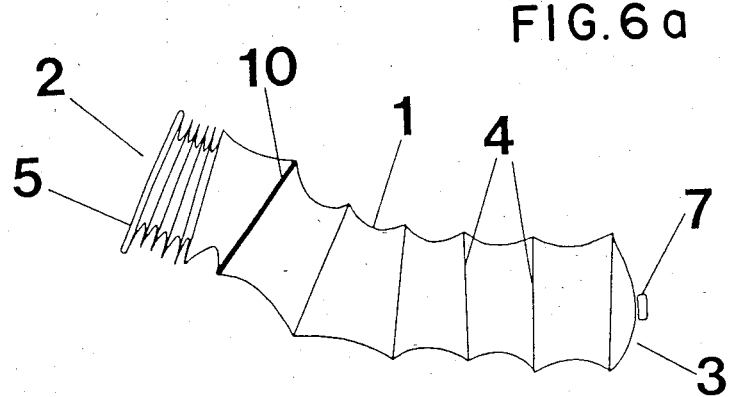
FIG. 6 illustrates the release of fish from a keepnet as shown in FIG. 5.

Fish retained in a keepnet fitted with a Doc-ring 10, as shown in FIG. 5, can be released quickly and efficiently as follows. The mouth-ring 5 at the open end of the net is held in one hand while the other hand collects together the flexible plastic support rings above the Doc-ring 10. When the Doc-ring is reached, it is grasped from within the keepnet and pulled out through the wider-diameter mouth-ring 5. The flexible plastic support rings 4 distort easily to allow this to be done smoothly. The various steps are illustrated in FIGS. 6(a), (b) and (c). By doing this, the keepnet is effectively shortened to at least half its original length, with the Doc-ring 10 now functioning as a secondary mouth-ring. The fish can be released by inverting the net as usual but note that the tumbling of fish has been reduced by more than 50%.

It is important to note at this point that although it is possible to perform the same actions with one of the flexible plastic support rings 4, the mere fact that these rings are flexible makes the whole procedure impractical on several grounds. Firstly, when being pulled through the mouth-ring, the flexible plastic support ring would not pull through cleanly. It would instead distort to an elongate oval shape which would necessitate exaggerated movements by the operator or the use of two hands to pull free. Secondly, when the flexible plastic support ring has been passed through the mouth-ring, its lack of strength and rigidity would allow no control to guide fish into a weighing-net or even back into the water for immediate release. And thirdly, the use of flexible plastic support rings for such a purpose would damage them or at least weaken them with permanent kinks.

It has been clearly demonstrated in field tests that if one of the intermediate rings of a keepnet is to be used to shorten the net and thus act as a secondary mouth-ring prior to the release of fish, the ring must be substantially rigid in accordance with the invention. It should also be said that the use of a single Doc-ring to empty a keepnet is not only extremely efficient but it is also particularly reliable since the basic structure of a keepnet is not radically altered. If, as an alternative, a special opening device such as a zip was fitted to the terminal end of a keepnet it would always be considered as potentially capable of failure. This would preclude its use in competition angling, particularly if heavy catches were anticipated.

To enable the Doc-ring to be easily recognised and located during the emptying procedure the Doc-ring is preferably distinctly coloured. Most keepnets are black, green or blue so a red-coloured Doc-ring would be perfectly suitable.

Some keepnets are designed with square or rectangular flexible plastic support rings. To fit such designs of keepnets with a Doc-ring the Doc-ring may also be square or rectangular in shape. An oval-shaped Doc-ring is also suitable.

Figure 6B:
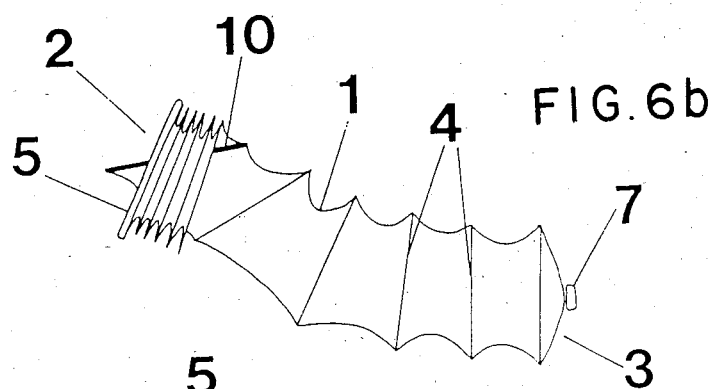
Figure 6C:
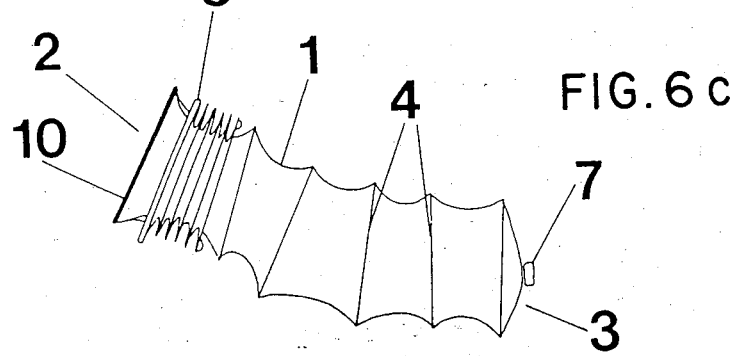

To be effective a Doc-ring can be used to substitute any of the flexible intermediate plastic support rings of a keepnet. As will be apparent from FIGS. 6(a, b, c), however, the effectiveness of the Doc-ring will be increased if it is positioned nearer to the closed end. Field tests have shown that irrespective of its location along the keepnet length, the Doc-ring has no adverse effects on the fish being retained (even if the fish are relatively large). It is important to mention that if the fish are not unduly disturbed they tend to remain fairly inactive in keepnets. It is therefore preferred that in order to further minimise the tumbling of fish when the keepnet is emptied, the Doc-ring should be positioned at a distance of about one meter from the closed end. The maximum distance between the Doc-ring and the closed end should preferably not exceed a full arms-span i.e. about 1.5 meters. If a Doc-ring is positioned one meter from the closed end of a keepnet which is, say, 3 meters long, then the tumbling of fish is subsequently reduced by about 70%.

Figure 7:
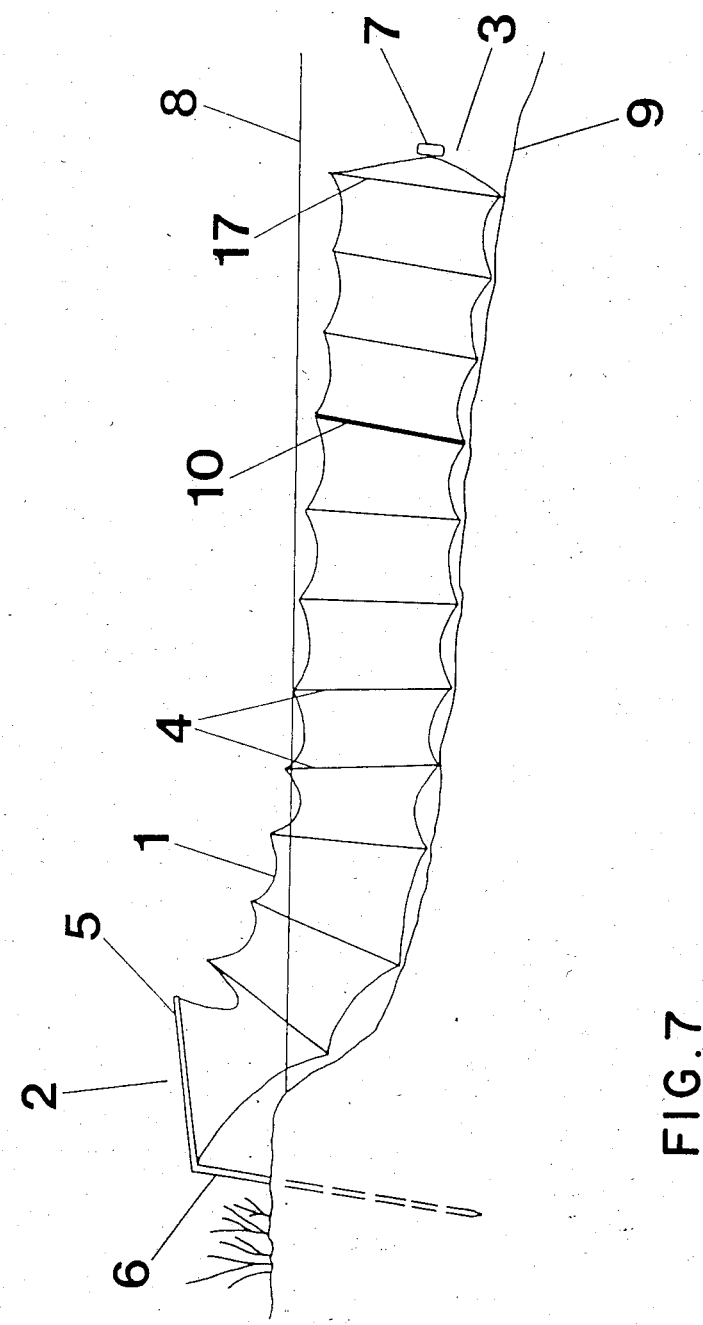
FIG. 7 is a similar view to that of FIG. 5 showing another form of keepnet according to the invention also utilising the first mechanism.

However, when a keepnet fitted with a Doc-ring is being emptied, it is turned 'inside-out' so that the Doc-ring then substitutes for the mouth-ring, thus shortening the keepnet. If the Doc-ring is positioned near to the closed end it is possible that the upper part of the keepnet will overlap the closed end when the net is being emptied. In order to eliminate this possible source of inconvenience, as shown in FIG. 7, the terminal flexible plastic support ring 17 of the keepnet should be extra-large in diameter i.e. larger in diameter than the Doc-ring and the intermediate plastic rings and at least as large as the mouth-ring 5. If, for example, the flexible plastic support rings of a keepnet are 20 inches (51 cms) in diameter, then the diameter of the terminal flexible plastic support ring should be increased to about 22 inches (56 cms), i.e. at least as large in diameter as the mouth-ring.

Figure 8:
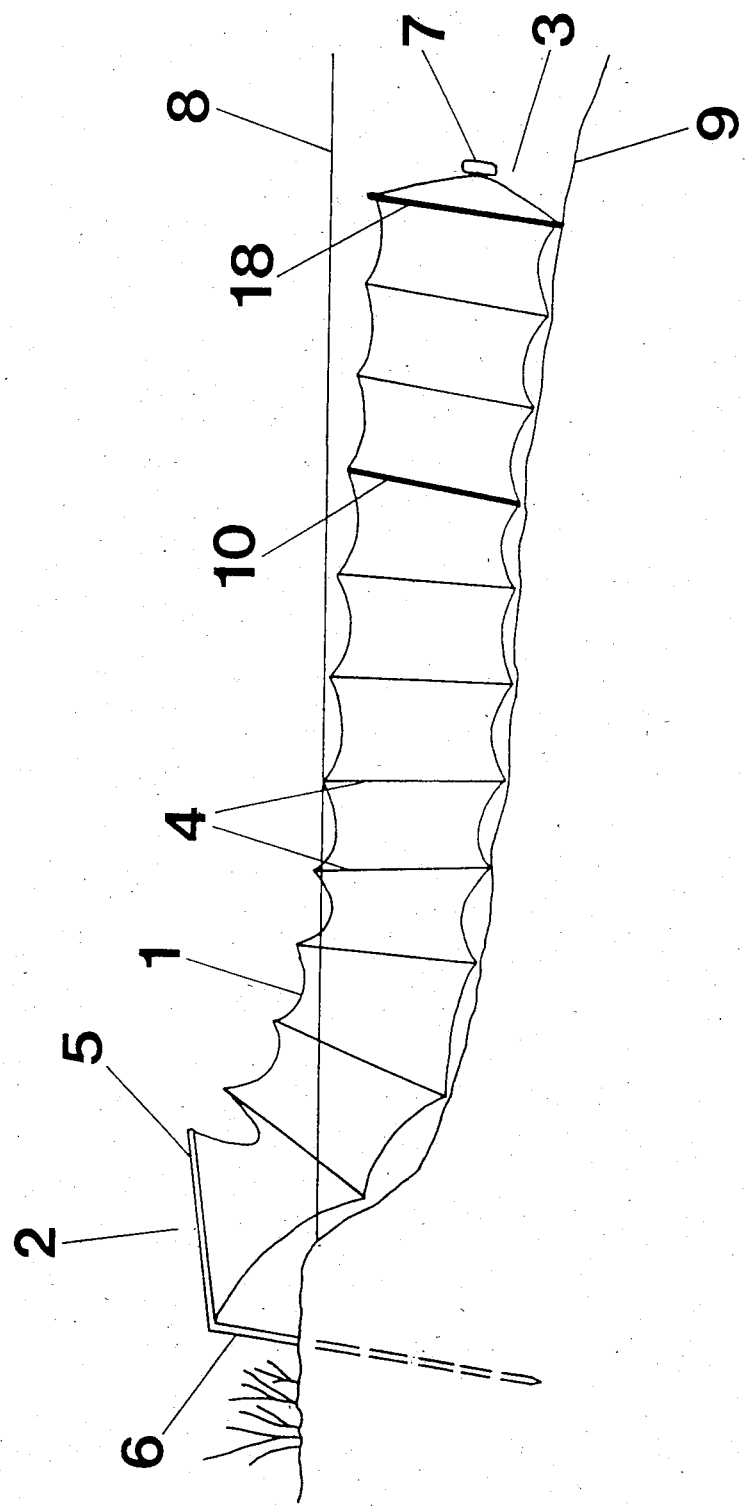
FIG. 8 is a similar view to that of FIG. 5 showing yet another form of keepnet according to the invention utilising the first mechanism.

In the embodiment illustrated in FIG. 8, a keepnet fitted with a Doc-ring 10 positioned at a distance of say one meter from the closed end, has the flexible terminal plastic support ring at the closed end 3 substituted with another Doc-ring 18 i.e. a substantially rigid ring of extra-large diameter, both the Doc-rings being constructed as shown in FIG. 3. If, for example, the flexible plastic support rings of the keepnet are 20 inches (51 cms) in diameter, then the terminal Doc-ring should be about 22 inches (56 cms) in diameter. The main purpose of the use of this additional Doc-ring 18 as the terminal ring is to ensure that the closed end of the keepnet remains fully erect when underwater thus providing the captured fish with the maximum swimming space available. This is of course accomplished by the 'upright stability' of the terminal Doc-ring. Keepnets have a tendency to collapse at the terminal end, particularly in still water. A keepnet fitted with two Doc-rings as described can therefore be considered as particularly suited to ponds and lakes.

The effectiveness of a keepnet fitted with two Doc-rings 10 and 18 as shown in FIG. 8, can be enhanced by adding buoyancy floats and/or sinking weights to the terminal Doc-ring 18, as well as or in addition to providing it with 'upright stability' by virtue of its construction. It is essential for the terminal Doc-ring to remain upright and stable in the water in order to provide the fish with the maximum swimming space available. Purpose-built weights can be fastened to the terminal Doc-ring on the underside of the keepnet and purpose-built buoyancy units (for example, hollow polystyrene or hollow plastics floats) on the top-side. The lake or river in which the keepnet is being used is likely to dictate the particular requirements.

MECHANISM TWO: THE 'DOC-END'

The second mechanism is essentially similar to the first mechanism except that the Doc-ring is incorporated into the keepnet as the intermediate ring immediately adjacent to the closed end. The terminal flexible support ring at the closed end can, if desired, also be substituted by a substantially rigid ring, i.e. a second Doc-ring. The diameter of the first Doc-ring can be the same diameter as the flexible plastic support rings of the keepnet or slightly smaller (about say 5 cms smaller), whilst the diameter of the second Doc-ring (if used) should be slightly larger than the diameter of the flexible plastic support rings (about say 5 cms larger). Such an arrangement is illustrated in FIG. 9. The two Doc-rings 19 and 20 situated at the terminal end of the keepnet constitute a 'cod-end' within which the fish tend to stay during keeping. Such a cod-end employing two adjacent Doc-rings at the closed end of the net will hereinafter be referred to as a 'Doc-end'.

In order to provide plenty of space in the Doc-end region so that large catches can be adequately accommodated, it is advisable to increase the distance between the two Doc-rings to about 45 cms or even 60 cms, i.e. up to about double the standard spacing between the flexible plastic support rings of the keepnet.

Figure 10:
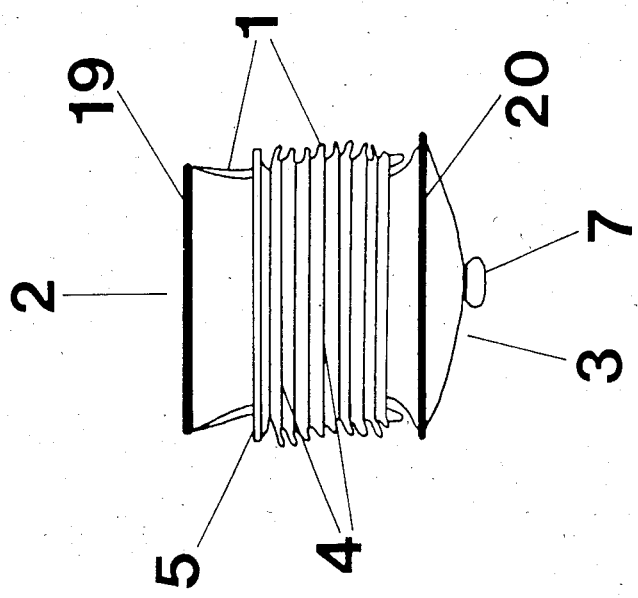
FIG. 10 is a schematic side view of the keepnet of FIG. 9 ready for the release of fish.

Fish can be released from a keepnet fitted with such a Doc-end in a similar manner to that described in respect of mechanism one and illustrated in FIGS. 6(a), (b) and (c). The first Doc-ring 19 is grasped from within the keepnet and pulled out through the mouth-ring 5. However, with this system, the tumbling of fish has been substantially completely eliminated, since the keepnet has effectively been shortened to its minimum length, as shown in FIG. 10.

It is important to note here that when the keepnet is staked out in the water the 'upright stability' property of the two Doc-rings 19 and 20 situated at the terminal end if they are of the preferred construction shown in FIG. 3, ensures that the Doc-end of the keepnet remains fully erect thus providing the maximum space for the angler's catch. An addtional advantage of a keepnet fitted with a Doc-end is that when the collapsed keepnet is trapped between the two Doc-rings (i.e. after the keepnet has been emptied) the entire keepnet can be conveniently transported by using the Doc-rings as handles.

The versatility of a keepnet fitted with a Doc-end can be enhanced by incorporating more weight into the Doc-rings used. The additional weight at the terminal end enables such a keepnet to remain consistently erect and stable under the difficult conditions found in tidal rivers or in rivers with heavy boat traffic. It also enables the keepnet to be staked out in a river with the terminal end positioned up-stream of the open end or even across the flow (i.e. at right angles from the bank) in rivers of moderate flow.

Figure 11:
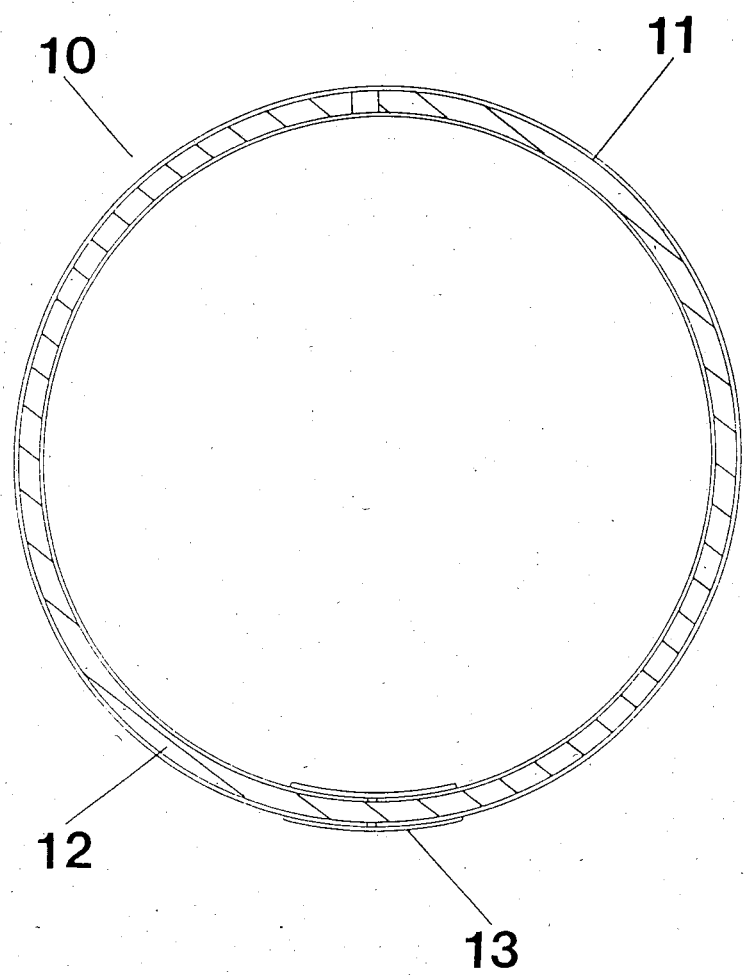
FIG. 11 is a schematic end sectional view of another form of Doc-ring suitable for use in keepnets utilising the second mechanism.

The structure of such a 'heavy-weight' Doc-ring is essentially the same as that described for the standard Doc-ring 10, shown in FIG. 3, except that the metal plug 12 (preferably of steel rather than aluminium rod) is longer and thus heavier. To increase the weight still further, as shown in FIG. 11, the heavy-weight Doc-ring can be made from a full circle of metal rod enclosed in plastics tubing 11. The join of the plastics tubing 11 is sealed with a plastics or rubber sleeve 13 to prevent entry of water.

If the heavy-weight Doc-ring is made from a full circle of steel (which for a Doc-ring of standard diameter would weigh about 0.5 kilos) then it is preferred that such a ring is used as only the terminal Doc-ring of the Doc-end (i.e. the second Doc-ring 20). If the heavy-weight Doc-ring is made rom a full circle of aluminium then in order to provide sufficient weight it is preferred that such a ring should be used for both Doc-rings of the Doc-end.

If a keepnet having a Doc-end keepnet is fitted with two heavy-weight Doc-rings then the following modification illustrated in FIG. 12 is advantageously used. In this modification, the distance between the first Doc-ring 19 and the flexible plastic support ring 21 next in line to it on the open end side is increased to an extent such that the mesh in between these rings can be gathered in the middle and secured with a quick-release fastener 22. The purpose of this is to ensure that while the keepnet is in use the fish are retained in the main cavity of the net and do not have access into the Doc-end region until the quick-release fastener is undone just before their release.

The quick-release fastener can be a length of cord suitably tied or, for maximum efficiency, a short length of double-sided burr-type fastener material, such as is sold under the Trade Name 'Velcro' wound into a 'swiss-roll' shape for fastening. The optimum dimensions of the length of 'Velcro' material are about 15 cms long and 3 cms wide. Such a fastener is shown in FIG. 19. To release fish from the keepnet, the fastener must first be undone so that the first Doc-ring 19 can be passed through the mouth-ring 5. This can be done with the keepnet in the water or after the keepnet has been lifted out of the water and is lying on the bank. The former is preferable but not always possible. The burr-type quick-release fastener is extremely effective and can be considered as 'fail-safe'. It will not burst open, whatever the weight of the catch being lifted. In fact the weight of the catch applies a force on the 'Velcro' material which acts to tighten it more firmly. The fastener is very easy to secure in position and equally easy to undo. Preferably, the 'Velcro' material is brightly coloured so that it is easily visible.

If the modification illustrated in FIG. 12 is to be used, then it is preferred that the first Doc-ring 19 should be sewn into the keepnet mesh so that it lies inside the cavity of the keepnet rather than outside as do all the other rings including the second Doc-ring 20. This facilitates a cleaner withdrawal of the first Doc-ring 19 through the mouth-ring 5. A doc-ring so located inside the keepnet has been illustrated in FIG. 4.

It is important to note than when a keepnet as shown in FIG. 12 is staked out in the water the weight of the two Doc-rings 19 and 20 of the Doc-end serves as an anchor which holds the main cavity of the keepnet fully erect and stable in order to provide the maximum space for the fish being retained. Unlike the standard Doc-ring previously described and shown in FIG. 3, the heavy-weight Doc-rings made from a full circle of metal do not possess the property of 'upright stability'. This means that the Doc-end remains in a collapsed state when the keepnet is in the water and this enhances its effectiveness as an anchor.

A keepnet fitted with a Doc-end consisting of two heavy-weight Doc-rings as shown in FIG. 12 can be further improved by fitting a standard Doc-ring of the kind shown in FIG. 3 which can be positioned about half-way along the keepnet length, or about one meter from the point of attachment of the quick-release fastener. Such an addtional Doc-ring is shown at 23 in the Doc-end keepnet shown in FIG. 14. Such a keepnet would provide the angler with two alternative ways of emptying out the catch. The diameter of this addtional Doc-ring 22 must, of course, be sufficiently large to allow the first Doc-ring 19 of the Doc-end to pass through it, when the Doc-end is used to retain the catch.

As shown in the form of keepnet illustrated in FIG. 15, it is possible to modify the Doc-end region of a keepnet so as to provide the normally closed terminal end of the keepnet with an opening device which would facilitate the rapid release of fish through this end with the keepnet still in the water.

In this embodiment the mesh at the bottom (normally closed) end of the keepnet (i.e. the round mesh bottom which is supported by the second Doc-ring 20) is removed and the quick-release fastener 22 is relocated to a position in between the first Doc-ring 19 and the second Doc-ring 20, then the Doc-end can function as a terminal opening for the keepnet, when required. The captured fish can be released with the keepnet still in the water by simply undoing the quick-release fastener and allowing the fish to swim out of the keepnet through the two Doc-rings.

Preferably, the Doc-rings used for a keepnet having a Doc-end terminal opening device should be of standard Doc-ring construction as shown in FIG. 3. The 'upright stability' of two standard Doc-rings situated at the terminal end of the keepnet would ensure that the keepnet would remain fully erect and stable when underwater. As shown in FIG. 15, an additional Doc-ring 23 can be incorporated into the keepnet in a position about halfway along the keepnet length, or about one meter rom the point of attachment of the quick-release fastener. Such a keepnet would provide two alternative ways of emptying out the catch.

Also, it is possible to provide a further Doc-ring immediately next to the ring 19 and spaced therefrom to allow a second quick-release fastener to hold the net gathered between the rings, thus forming a cod-end.

A keepnet fitted with a Doc-end terminal opening device may have limited application in competition angling but may instead be regarded as ideally suitable for casual pleasure fishing sessions or for retaining an individual fish of specimen proportions.

As previously stated, some keepnets are designed with square or rectangular flexible plastic support rings. To fit such designs of keepnet wth a Doc-end, the Doc-rings (both the standard Doc-rings and the heavy-weight Doc-rings) which make up the Doc-end should be square or rectangular in shape. Oval-shaped Doc-rings would also be suitable.

MECHANISM THREE: THE 'DOC-END' WEIGHING-NET ASSEMBLY

The third mechanism provides a keepnet according to the invention which not only completely eliminates the tumbling of fish but also eliminates the need to transfer the fish from the keepnet to the weighing-net. This is accomplished by mounting a detachable weighing-net at the closed end of the keepnet. A keepnet fitted with a 'Doc-end' weighing-net assembly may be considered as being particularly suitable for competition angling.

As shown in FIG. 16, the 'Doc-end' weighing net assembly basically consists of two components, a weighing-net 24 and a weighing-net holder 25. The weighing-net holder is simply sewn into the keepnet to replace the penultimate flexible plastic support ring at the closed end (i.e. the flexible intermediate ring adjacent to the terminal ring).

The weighing net has a circular frame 26 (shown more clearly in FIG. 18) and can be made from quarter-inch (6 mm) aluminium alloy rod or, for addtional weight and strength, stainless steel rod of similar thickness. The frame 26 basically consists of two semi-circles jointed together, so that the two halves can be folded together to close the weighing net. The joints can be held together with rivots, or better still with strong cord suitably tied. The diamter of the frame 26 is such that it can fit comfortably inside the frame-ring 27 of the weighing-net holder 25 (see FIG. 18) i.e. the diameter of the frame 26 of the weighing-net 24 is dependent on the diameter of the frame-ring 27 of the holder 25.

A loop of strong nylon strap or equivalent material is attached at the mid-point of one of the semi-circles forming the frame of the weighing-net. This loop serves to attach the weighing-net to the scales or spring-balance when the catch is being weighed.

The mesh of the weighing-net can be made from the same netting as that used for the keepnet, although a very fine aperture mesh is preferable since it reduces the possibilites of damaging the fins of fish.

As shown in FIG. 18, the weighing-net holder is supported by a circular frame-ring 27, which in this embodiment forms the substantially rigid intermediate ring. This frame-ring 27 can be made from quarter-inch (6 mm) aluminium alloy rod or, for additional weight and strength, stainless steel rod of similar thickness. The diameter of the frame-ring 27 can be approximately the same diameter as the flexible plastic support rings of the keepnet. The two loose ends of the frame-ring should be riveted together to close the ring and thus provide substantial rigidity. This is best done after the frame-ring has been fitted with the special sleeve 28 of the weighing-net holder.

Figure 17E:
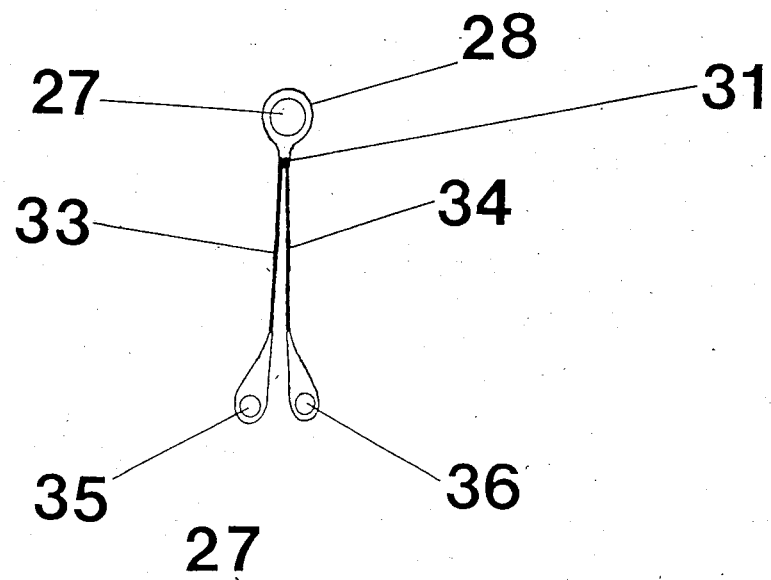
Figure 17F:
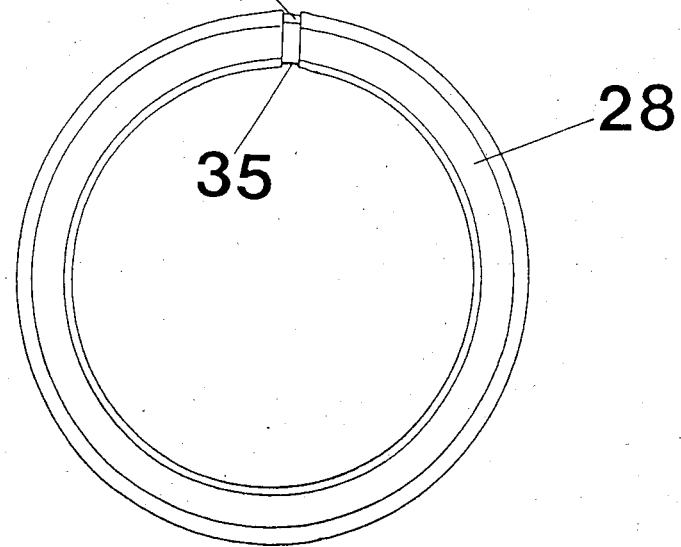

The sleeve 28 can be made from any suitable rot-proof fabric material, for example, nylon, terylene or polyester cloth or even fine-aperture keepnet mesh. The length of the sleeve is the same as the length of the metal rod used to make the frame-ring 27, i.e. the same as the circumference of the frame-ring. Successive steps in the construction of the sleeve 28 are shown in FIGS. 17(a)-(f), starting from a strip 29 of the sleeve material as shown in FIG. 17(a).

The length of the strip of material used for the sleeve 28 depends on the diameter of the frame-ring 27. If, for example, the frame-ring is 20 inches (50 cms) in diameter, then the length of the strip should be about 60 inches (1.5 meters). The width of the strip in this case could be about 22 cms.

To form the sleeve, the strip 29 is folded as shown in FIG. 17(c) and is then stitched along its entire length at the points 30. The strip is then folded down the middle as shown in FIG. 17(d) and stitched along its entire length at the points marked 31 to leave a single thickness for easy drying at the fold 32. The sleeve is then fitted to the frame-ring 27.

The sleeve 28 is supported by the frame-ring 27 which it covers. As shown most clearly in FIGS. 7(e) and (f), which show the completed sleeve attached to the frame-ring, the sleeve has two flaps 33, 34 which span the entire inner circumference of the frame-ring. The two flaps in turn support two addtional inner rings, one 35 made from a length of stretched rubber or like elastomeric material, providing a flexible flap and the other 36 made from a length of strong cord or thin plastic rod providing a more rigid flap. The plastic rod could be the same as that used to make the support rings of the keepnet, with the ring 36 being jointed using the same type of plug or ferrule. The rubber for the flexible flap 35 can be the same as that used for the catapults (about 6 or 7 mm thick unstretched). The rubber must be sufficiently stretched before being tied down to form the tensioned ring of the flexible flap.

The distance between the outer supporting frame-ring 27 and the two inner flap rings 35, 36, i.e. the width of the sleeve, is about 6 cms in the example under consideration.

In order to fit the weighing-net into the holder, as illustrated in FIG. 18, the frame 26 of the weighing-net is simply sandwiched in between the two flaps 33, 34. It can be pulled out of this mounting (and, of course, reinserted into it) merely by distorting the flexible flap 33 tensioned by the stretched rubber. The flap 34 held rigid by the cord or plastics rod does not distort and therefore does not allow passage of the weighing-net frame 26. When the weighing-net assembly is installed in the keepnet, the rigid flap 34 prevents the weighing-net frame 26 from passing through into the terminal region of the keepnet between the weighing-net holder and the closed end.

The weighing-net holder replaces the penultimate flexible plastic support ring of the keepnet at the closed end, (i.e. the flexible intermediate ring immediately adjacent to the terminal ring). It must be fitted so that the flexible flap 33 faces the open end 2 of the net and the rigid flap 34 faces the closed end 3. The distance between the weighing-net holder and the plastic support ring next in line to it on the open end side must be increased to an extent such that the mesh in between can be gathered in the middle and secured with a quick-release fastener 37 (e.g. of the burr-type previously mentioned). This ensures that while fish are in the keepnet, they do not have access into the weighing-net assembly area until just before their release.

Before the keepnet fitted with a Doc-end weighing-net assembly is used, the weighing-net must be loaded into the holder by tucking the frame 26 of the weighing-net under the flexible flap 33. The weighing-net assembly must then be isolated from the main cavity of the keepnet using the quick-release fastener 37. With practice, this operation takes less than two minutes. The keepnet can now be staked out into the water ready to receive fish.

To release fish from the keepnet, the fastener 37 must first be undone. This can be done with the net in the water or after the net has been pulled out of the water and is lying on the bank. The former is preferable but is not always possible. In either case the entire catch ends up in the weighing-net with the minimum of fuss.

To extract the weighing-net from the keepnet, the angler simply grasps the frame-ring 27 of the holder in one hand while the other hand reaches into the keepnet to locate the weighing-net frame 26 under the flexible flap 33. The frame 26 is then dislodged from the flap and the weighing-net, complete with all the fish, is pulled out through the mouth-ring 5.

It should be noted that the dimensions of the mesh part of the weighing-net should preferably be such that the depth of the net is greater than the distance between the weighing-net holder 25 and the terminal plastic support ring 17 at the closed end 3 of the keepnet. This is to ensure that when the keepnet is being lifted up with fish in the weighing-net, the weight of the catch is supported by the rigid metal frame-ring 27 of the holder rather than by the rigid flap 34. It is also desirable for the netting of the weighing-net to have a round bottom so that it conforms to the general shape of the terminal end of the keepnet.

In order to make it easier to extract the weighing-net (and fish) from the weighing-net holder, two further features can be incorporated into the system. The first feature consists in attaching a 'foot-tab' 38 (FIG. 19) to the terminal plastic support ring 17 at the closed end. This tab, which lies outside the keepnet, can be made from waterproof cloth or a strip of plastics or burr-type fastener material and may have a rectangular shape with dimensions of about 15 cms length and 3 or 4 cms width. The second feature is to use a brightly-coloured nylon loop-strap on the frame of the weighing-net.

Before using the keepnet, the angler must load the weighing-net into the holder so that the coloured loop-strap is in line with the foot-tab 38 at the end of the keepnet. When the angler is ready to extract the weighing-net from the keepnet, he simply anchors the closed end of the keepnet to the ground with one foot placed firmly on the foot-tab 38 and then pulls the weighing-net free using the coloured loop-strap which is easy to locate.

It is important to note at this point that when the keepnet is staked out in the water the weight of the weighing-net frame 26 and the weight of the frame-ring 27 of the weighing-net holder serve as an anchor which holds the main cavity of the keepnet fully erect, thus providing maximum space for the angler's catch. The effectiveness of this is enhanced if the weighing-net frame and frame-ring of the holder are made from stainless steel. A suitable compromise would be to use stainless steel for the frame-ring of the holder and aluminium alloy for the frame of the weighing-net.

As shown in FIG. 19, a keepnet fitted with a Doc-end weighing-net assembly can be further improved by fitting a standard Doc-ring 39 (constructed as shown in FIG. 3) which can be positioned about half-way along the keepnet length or about one meter from the point of attachment of the quick-release fastener 37. Such a keepnet would provide the angler with two alternative ways of emptying out the catch. The diameter of this additional Doc-ring 39 must be sufficiently large to allow the frame-ring of the weighing-net holder to pass through it.

As previously stated, some keepnets are designed with square or rectangular plastic support rings. The weighing-net assembly system described above can be adapted to fit such keepnets. The main modifications are that the frame of the weighing-net holder (and consequently the sleeve) and the frame of the weighing-net should also be square or rectangular, i.e. should conform to the shape and approximate size of the support rings.

It will be appreciated that other methods are possible for forming the sleeve of the weighing-net holder. For example, one relatively simple and cost-effective way is to form the sleeve from the mesh of the keepnet itself by sewing the frame-ring 27 into the mesh so that it lies outside the net cavity and then forming the flaps 33 and 34 by folding the mesh into the net cavity and finally sewing the mesh together along the inside perimeter of the frame-ring 27, as illustrated in FIG. 20.

I claim:

1. A keepnet comprising an elongate tubular net open at one end and closed at the other, a substantially rigid ring or frame at the open end serving to hold open the mouth of the net, and a terminal ring or frame at the closed end thereof, said net being supported by and fixedly attached to a plurality of rings or frames along the length thereof intermediate said mouth-ring or frame and said terminal ring or frame, said rings or frames being spaced and self supportive when operably placed within a body of water and freely collapsible upon each other when removed from said body of water, wherein the improvement comprises: at least one of said intermediate rings or frames being substantially rigid whilst the majority thereof are substantially flexible relative to said at least one substantially rigid ring, and said mouth-ring or frame being sufficiently larger than said intermediate rings or frames including said at least one substantially rigid ring or frame, to permit passage of the latter therethrough, whereby a portion of the keepnet may be collapsed and said at least one substantially rigid ring can serve as a secondary mouth-ring during removal of fish from said net and the effective length of the net is reduced during said removal of fish.

2. A keepnet as claimed in claim 1, wherein one of said at least one substantially rigid intermediate ring is located at a position at least half-way along the length of the net from the open end thereof.

3. A keepnet as claimed in claim 2, wherein said one of said at least one said substantially rigid intermediate ring or frame is located at a position approximately one-third of the length of the net from the closed end thereof.

4. A keepnet as claimed in claim 1, wherein said terminal ring or frame is at least as large as said mouth-ring or frame.

5. A keepnet as claimed in claim 4, wherein said terminal ring or frame is also substantially rigid.

6. A keepnet as claimed in claim 5, wherein said terminal ring is so constructed as to assume an upright position when said keepnet is in water during use.

7. A keepnet as claimed in claim 6, wherein said terminal ring or frame is provided with upper buoyancy devices and/or lower weighting devices.

8. A keepnet as claimed in claim 1, wherein one of said at least one substantially rigid intermediate ring or frame is located immediately adjacent to said terminal ring or frame.

9. A keepnet as claimed in claim 8, wherein the spacing between said terminal ring or frame and said one of said at least one substantially rigid intermediate ring or frame is greater than the spacing between any other pair of adjacent rings or frames.

10. A keepnet as claimed in claim 1, wherein said at least one substantially rigid intermediate ring or frame is so constructed as to assume a substantially upright position when said keepnet is in water during use.

11. A keepnet as claimed in claim 10, wherein said at least one substantially rigid intermediate ring or frame comprises a length of hollow plastics tubing bent to the form of said ring or frame, the ends of said tubing being joined by an internal metal plug which serves to weight the lower side of said ring or frame, and the gap between said ends being sealed externally in water-tight fashion by a sleeve of resilient material.

12. A keepnet as claimed in claim 8, wherein said terminal ring or frame is a relatively heavy ring made of hollow plastics tubing enclosing a metal rod extending over substantially the full length of the tubing.

13. A keepnet as claimed in claim 12, wherein said substantially rigid intermediate ring or frame is a relatively heavy ring made of hollow plastics tubing enclosing a metal rod extending over substantially the full length of the tubing.

14. A keepnet as claimed in claim 13, wherein the spacing between one of said at least one substantially rigid intermediate ring or frame and the immediately adjacent flexible intermediate ring or frame is increased to an extent such that the net within this space can be gathered together and secured by means of a quick-release fastener.

15. A keepnet as claimed in claim 14, wherein said quick-release fastener is a strip of double-sided burr-type fastening material.

16. A keepnet as claimed in claim 8, wherein one of said at least one substantially rigid intermediate ring or frame supports a holder for a removable weighing net housed in the space between said one of said at least one substantially rigid intermediate ring or frame and said terminal ring or frame, said weighing net having a length greater than the length of said space.

17. A keepnet as claimed in claim 16, wherein said holder comprises a peripheral portion enclosing said substantially rigid intermediate ring or frame and having two flaps extending inwardly therefrom, the inner periphery of one of said flaps supporting a rigid ring or frame and the inner periphery of the other of said flaps supporting a ring or frame of elastic material, the mouth-ring or frame of said weighing net being removably accommodated between said flaps and held in position by pressure exerted by the resilient ring or frame against said rigid ring or frame of said holder.

18. A keepnet as claimed in claim 17, wherein a foot tab is attached to said terminal ring or frame externally of said keepnet.

* * * * *